United States Patent

[11] 3,607,619

| [72] | Inventors | Howard V. Hess<br>Glenham;<br>Edward L. Cole, Fishkill, both of N.Y. |
|------|-----------|---|
| [21] | Appl. No. | 780,079 |
| [22] | Filed | Nov. 29, 1968 |
| [45] | Patented | Sept. 21, 1971 |
| [73] | Assignee | Texaco Inc.<br>New York, N.Y. |

[54] COKING OF BLACK LIQUOR IN THE ABSENCE OF ADDED FREE OXYGEN
6 Claims, 1 Drawing Fig.

[52] U.S. Cl.................................................... 162/30,
162/31, 162/34, 162/36, 210/63, 210/71
[51] Int. Cl........................................................ D21c 11/12
[50] Field of Search............................................ 162/30, 31,
34, 36; 210/56, 63, 71

[56] References Cited
UNITED STATES PATENTS

| 2,752,243 | 6/1956 | Barton et al. | 162/31 |
| 3,003,908 | 10/1961 | Mannbro | 162/36 X |
| 3,037,901 | 6/1962 | Thomsen | 162/36 X |
| 3,272,739 | 9/1966 | Earle et al. | 210/71 X |
| 3,507,788 | 4/1970 | Cole et al. | 210/63 |

Primary Examiner—S. Leon Bashore
Assistant Examiner—Arthur L. Corbin
Attorneys—K. E. Kavanagh and Thomas H. Whaley

ABSTRACT: Process for treatment of black liquors from kraft pulp mills wherein black liquor is heated, in the absence of added free oxygen, under pressure at a temperature in the range of 450 to 700° F. for a period of 0.5 minutes to 6 hours to form a solid granular coke product which is separated from the resulting liquid to yield an aqueous liquid effluent suitable for reuse in the pulp making process.

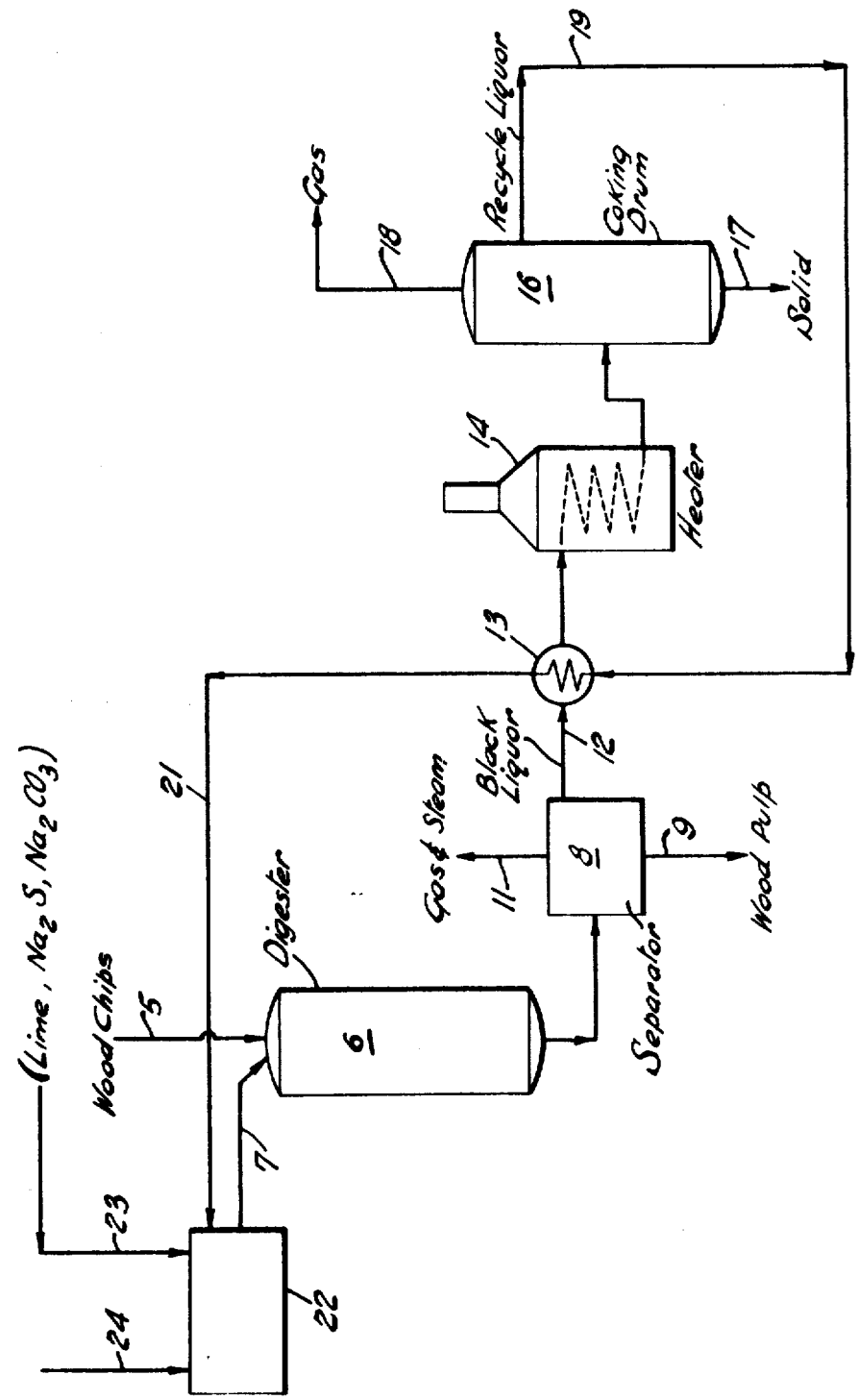

COKING OF BLACK LIQUOR IN THE ABSENCE OF ADDED FREE OXYGEN

This invention relates to a process for treatment of aqueous industrial wastes from kraft process pulp mills.

The process of this invention effects removal of organic matter from pulp mill waste liquors by carbonization with heat under elevated pressure in the absence of free oxygen. In one of its more specific aspects, the process of this invention comprises heating aqueous organic waste liquor to a temperature in the range of 450° to 700° F. at a pressure in the range of 300 to 3200 p.s.i.g. for a period of 0.5 minutes to 6 hours to form a granular solid coke, which is separated from the aqueous phase to yield an aqueous effluent of low chemical oxygen demand (COD). The term "coke" is used herein in its broad sense to denote a water insoluble carbonized solid residue of substantially reduced hydroxyl group content as compared with the organic material in the feed to the process.

In the production of pulp and paper, wood is treated with chemicals to remove lignin binder from the cellulose fibers in the wood. In the pulping process, about one half the dry weight of the tree is dissolved in the pulping liquor and only about one-half recovered as pulp. The soluble portion of the wood, most of which is discarded as waste, presents serious disposal problems.

Paper pulp is produced by three principal processes, namely the kraft or sulfide process, the sulfite process, and the soda process. The soda process uses sodium hydroxide to dissolve noncellulose materials from the wood whereas the sulfide process employs a mixture of sodium hydroxide and sodium sulfide.

Various methods have been devised for disposing of waste liquors from pulp ans paper mills. One process applied to black liquor from the kraft process involves concentrating the liquor in multiple effect steam evaporators to increase the concentration of solids from about 15–18percent to 48–54percent. In one process, liquor from the multiple effect evaporators is further concentrated in multiple disc evaporators to a total solids content of 58 to 62 percent and the concentrated liquor is then sprayed into a recovery furnace where it is burned to generate steam. Sodium sulfate ($Na_2SO_4$) and sulfur may be added to the concentrated liquor before it is fed into the recovery furnace. Sodium sulfide and sodium carbonate are recovered from the slag from the furnace, and lime and sodium hydroxide are added to the recovered chemicals to make up white liquor for the pulping process. The process is described in detail in Industrial and Engineering Chemistry, Volume 42, No. 5 (May, 1950) pages 756–767.

Spent liquors from pulp plants also may be processed in a fluid bed system which involves suspending solid particles in an upwardly moving stream of hot air or steam and spraying the liquor into contact with the hot granular particles in the fluidized bed. The fluidized bed is usually maintained at a temperature of about 1300° F. The spent liquors are usually concentrated prior to introduction to the bed, black liquor may be concentrated to about 60 solids.

When black liquor from the kraft process is processed in such chemical recovery systems, there is a danger of increasing air pollution by sulfur dioxide, hydrogen sulfide or mercaptans liberated in the furnace or fluid bed system.

The present process involves a novel and improved method for treatment of black liquor from the kraft pulp process. In the process of this invention, the black liquor is heated in the absence of free oxygen to an elevated temperature in the range of 450° to 700° F., preferably 450° F., to 625° sufficient pressure to prevent vaporization of the water, and maintained at said elevated temperature and pressure for a period of time in the range of 0.5 minutes to 6 hours, preferably in the range of 1 minute to 4 hours, sufficient to produce granular coke. Coke is separated from the resulting aqueous liquid, hereinafter termed "green liquor," which is recycled to the process.

The process of this invention will be better understood by reference to the accompanying figure illustrating diagrammatically a preferred embodiment of the present invention as applied to the treatment of black liquor from a kraft pulp mill.

With reference to the figure, wood chips from a suitable source of supply are introduced through line 5 into a digester tank 6 where they are cooked in cooking liquor supplied through line 7. Generally, the chips are processed at a temperature in the range of 340° to 355° F. under a pressure of 100 to 125 p.s.i.g. for 2 to 5 hours with a 12.5 percent solution of sodium hydroxide, sodium sulfide, and sodium carbonate. The solids in the solution typically comprise 58.6 percent sodium hydroxide, 27.1 percent sodium sulfide and 14.3 percent sodium carbonate by weight. Sodium hydroxide and sodium sulfide are the active chemical agents; the carbonate is inactive and represents the equilibrium residue between lime and sodium carbonate in the formation of sodium hydroxide. Various kinds of wood are suitable for the wood chips, including hemlock, Douglas fir, white fir, and pine.

At the end of the cooking period, the contents of the digester 6 are discharged to a separation system 8 where wood pulp is separated from resulting black liquor. Wood pulp is separated from black liquor by filtration and removed from the separator through line 9. Gas ans steam liberated from the black liquor and the wood pulp as a result of pressure release upon dumping the digester are removed through line 11 for further processing. It is to be understood that the process for digesting and cooking the wood chips and separating wood pulp and black liquor from the digester effluent form no part of the present invention but are representative of conventional operations.

According to the present invention, black liquor leaving the separator 8 through line 12 is heated to a temperature in the range of 400° to 700° F., in this example, to a temperature of 625° F., in the absence of added free oxygen. This is accomplished in this specific example by first passing the black liquor through a heat exchanger 13 where it is preheated with hot recycle liquor from a source described hereinafter and then fed into a fired heater 14 where the temperature of the black liquor is raised to the desired coking temperature, e.g., 625° F. The hot black liquor is then introduced into a coking drum 16 in the form of a large pressure vessel suitable for holding the heated black liquor at the desired processing temperature and pressure, e.g., 625° F. and 2,250. p.s.i.g., for a period of from 2 to 6 hours. In the coking drum, organic components of the black liquor are decomposed and dehydrated to a carbonized solid or coke which is discharged at the end of the coking period from the lowermost part of the coking drum through line 17. During the coking process, combined oxygen in the sugars, acids, and other organic oxygen compounds are converted to water and $CO_2$ by dehydroxylation and decarboxylation.

A small amount of gas is liberated in the process and may be discharged from the upper part of drum 16, continuously or intermittently, through line 18. Aqueous liquid free from carbonized solids and containing dissolved sodium hydroxide, sodium sulfide and sodium carbonate is drawn from the coking drum through line 19, passed through heat exchanger 13 to preheat the black liquor from separator 8 and passed through line 21 to the white liquor preparation system 22. In the preparation of the white liquor from the recycle liquor from coking drum 16 the recycle liquor is mixed with suitable chemical reagents, i.e., calcium oxide, calcium carbonate and sodium hydroxide, introduced through line 23 to make up the white liquor. Makeup water, may be supplied through line 24, as required.

The coking zone may be operated continuously, as illustrated, with continuous introduction of black liquor and continuous withdrawal of aqueous effluent depleted in organic matter. By-product gas may be withdrawn from the coking zone continuously or intermittently. The volume of gas produced is small, but the gaseous products of the process contain a substantial amount of dimethyl sulfide (typically 7 to 8 percent by volume) which may be recovered as a valuable by-product of the process. Coke may be discharged from the coking zone intermittently, as required, and liquid withdrawn with the coke separated therefrom in any suitable manner, e.g., by filtration (not illustrated) and returned to the process.

The following examples further illustrate the process of this invention as applied to treatment of black liquor from the kraft pulp process. The black liquor treated contained 17.2 weight per cent total dissolved solids.

| Example No. | 1 | 2 | 3 | 4 | 5 | 6 |
|---|---|---|---|---|---|---|
| Process conditions: | | | | | | |
| Temperature, °F | 450 | 500 | 550 | 600 | 625 | 650 |
| Pressure, p.s.i.g | 450 | 800 | 1,280 | 1,950 | 2,250 | 2,600 |
| Time, hours | 6 | 6 | 6 | 2 | 6 | 2 |
| Product liquid: | | | | | | |
| Percent dissolved solids | 14.4 | 12.4 | 11.3 | 9.5 | 10.5 | 9.9 |
| Weight percent of feed | 98.4 | 98.0 | 98.0 | 98.2 | 96.6 | 98.2 |

In a series of tests the black liquor was coked under different time-temperature conditions. The amount of coke removed is a measure of the effectiveness of the coking operation.

| Example No. | 7 | 8 | 9 | 10 | 11 |
|---|---|---|---|---|---|
| Process conditions: | | | | | |
| Temperature, °F | 550 | 550 | 550 | 600 | 600 |
| Pressure, p.s.i.g | | | Autogenous | | |
| Time at temp., min | 1 | 5 | 120 | 1 | 5 |
| Dry coke¹ recovered, wt. percent of charge | 0.68 | 1.82 | 3.88 | 2.73 | 3.41 |

¹ Dried to approximately constant weight on steamplate.

Coke produced in the process has a heating value of about 13,000 B.t.u. per pound. The coke may be burned to supply heat for the process and to recover chemicals contained therein or used as a soil conditioner. Alternatively, it may be further carbonized by heating to produce high grade coke for metalurigical purposes, or heated and partially oxidized to produce a good grade of activated carbon. Activated carbon is useful for final purification of waste water streams.

Compositions of black liquor, process coke, and treated liquor, basis 1,000 pounds black liquor, processed at 625° F. at 2,250 p.s.i.g. for 6 hours (from example 5) are shown in table I.

TABLE I

| Weight, Lbs. | Black Liquor | Treated Liquor | Coke |
|---|---|---|---|
| Total weight | 1,000 | 914 | 52 |
| Organic Solids | 170 | | |
| Sodium* | 34.2 | 29.8 | 1.5 |
| Sulfur | 2.9 | 0.14 | 110.5 |

*Reported as sodium hydroxide

Cooking liquor is prepared from the recycled liquor by the addition of lime and salt cake, using coke from the process to reduce the salt cake. For example, in a typical operation wherein the black liquor contains some 30 percent wash water, the treated liquor is first concentrated by evaporation to remove excess water, and then converted to cooking liquor by addition of chemicals. In this example, part of the coke, 10.3 percent, is used for reaction with salt cake ($Na_2SO_4$) to produce sodium sulfide for reconstituting the cooking liquor. The remaining coke is burned to supply process heat and for recovery of chemicals. Sodium sulfide (1.27 pounds) and sodium carbonate (175 pounds) are recovered from the 52 pounds of coke obtained on precessing 1,000 pounds of black liquor as indicated in table I above. For each 1,000 pounds of black liquor treated, 4.8 pounds of the resulting coke is used for reaction with 28.4 pounds sodium sulfate ($Na_2SO_4$) to provide 15.5 pounds sodium sulfide for the makeup of cooking liquor.

In addition, 5.6 pounds sodium carbonate and 42.3 pounds lime ($Ca(OH)_2$) are added to the treated recycle liquor, basis 1,000 pounds of black liquor treated, to provide sodium hydroxide required for the cooking liquor. Calcium carbonate produced in the reaction between the sodium carbonate and lime is separated from the reconstituted cooking liquor, e.g., by filtration.

The chemicals required for regeneration of cooking liquor from treated liquor derived from 1,000 pounds of black liquor are shown in table II.

TABLE II

| Chemical | Weight, Lbs. |
|---|---|
| Sodium Sulfate ($Na_2SO_4$) | 28.4 |
| Sodium Carbonate ($Na_2CO_3$) | 5.6 |
| Lime ($Ca(OH)_2$) | 42.3 |

Typical composition of the uncondensable portion of the gas discharged from the coker under the above described coking conditions and black liquor composition is shown in Table III.

TABLE III

| Component | Volume Percent |
|---|---|
| Dimethyl Sulfide | 7.8 |
| Carbon Dioxide | 17.3 |
| Hydrogen Sulfide | 0.9 |
| Methane | 4.5 |
| Hydrogen | 68.0 |
| Inert Gas | 1.5 |

This gas may be processed for recovery of dimethyl sulfide as a byproduct of the process.

We claim:

1. A process for the treatment of black liquor from kraft pulp mills which contains inorganic salts and organic matter derived from wood consisting of preheating said liquor with effluent from a subsequent coking step; coking said black liquor at a temperature in the range of about 450° to about 700° F. in the absence of added free oxygen under sufficient pressure to prevent vaporization of water and for a period of time in the range of about 0.5 minutes to about 6 hours to produce coke, gas and an aqueous effluent containing said inorganic salts; and separating the thus-formed products from one another.

2. The process defined in claim 1 comprising continuously introducing said waste liquor into a coking zone of relatively large volume at a rate sufficient to maintain an average residence time of liquor in said zone at said temperature and pressure in the range of one to 6 hours and continuously withdrawing said aqueous effluent from said coking zone.

3. The process as defined in claim 1 comprising heating said liquor to between about 450° and 625°, introducing said heated liquor at a given point in a vertical cooling zone to produce coke and gas therein, withdrawing said gas from the uppermost portion of said coking zone, withdrawing said coke from the lowermost portion of said coking zone and withdrawing an aqueous effluent containing soluble inorganic salts from said black liquor from the upper portion of said coking zone intermediate the point of introduction of said heated liquor and the point of withdrawal of said gas.

4. The process as defined in claim 1 comprising adding lime, sodium sulfate and sodium carbonate to said aqueous effluent to form cooking liquor for contact with wood chips at elevated temperature and pressure thus producing kraft process pulp and additional black liquor.

5. The process as defined in claim 4 comprising first concentrating said aqueous effluent to remove excess water.

6. The process as defined in claim 5 wherein said concentration is effected by evaporation.